Feb. 25, 1969 T. J. O'CONNOR 3,430,026
QUICK-CHANGE TOOL FOR ELECTRICAL MACHINING INCLUDING
STRUCTURE FOR SIMULTANEOUSLY ECCENTRICALLY
ROTATING AND REVOLVING AN ELECTRODE
Filed Jan. 8, 1968

INVENTOR
THOMAS J. O'CONNOR

BY *Whittemore Hulbert & Belknap*

ATTORNEYS

United States Patent Office 3,430,026
Patented Feb. 25, 1969

3,430,026
QUICK-CHANGE TOOL FOR ELECTRICAL MACHINING INCLUDING STRUCTURE FOR SIMULTANEOUSLY ECCENTRICALLY ROTATING AND REVOLVING AN ELECTRODE
Thomas J. O'Connor, 100 Morgan Road,
Ann Arbor, Mich. 48104
Application Oct. 24, 1965, Ser. No. 504,971, which is a continuation-in-part of application Ser. No. 250,321, Jan. 9, 1963. Divided and this application Jan. 8, 1968, Ser. No. 696,281
U.S. Cl. 219—69        10 Claims
Int. Cl. B23k 9/16

ABSTRACT OF THE DISCLOSURE

A tool for use with electrical machining apparatus to cut an opening having an area larger than the cross section of the electrode used to cut the opening. The tool includes a dovetail base plate portion for rapid, accurate securing of the tool to electrical machining apparatus. Servo-motor driven means is provided for moving an electrode connected to the tool in a circular path having a center eccentric to the axis of the electrode. Structure is also provided for adjusting the position of the longitudinal axis of the electrode with respect to the center of the path about which the electrode is rotated and for simultaneously revolving the electrode about its own longitudinal axis while moving the electrode in a circular path to equalize electrode wear.

CROSS REFERENCE TO RELATED APPLICATIONS

This application is a division of application Ser. No. 504,971, filed Oct. 24, 1965, now Patent No. 3,363,083 which is a continuation-in-part of application Ser. No. 250,321, filed Jan. 9, 1963, now Patent No. 3,222,494.

BACKGROUND OF THE INVENTION

*Field of the invention*

The invention relates to electrical machining and refers more specifically to a quick-change electrode supporting tool for electrical machining in conjunction with electrical machining apparatus including structure for rapidly and accurately securing the tool to the electrical machining apparatus and for moving an electrode secured to the tool in a circular path having a center eccentric to the longitudinal axis of the electrode and for simultaneously rotating the electrode about the longitudinal axis thereof.

*Description of the prior art*

In the past electrical machining has generally been restricted to machining a cross section identical with the cross section of an electrode supported by electrical machining apparatus over a workpiece on movement of the electrode toward the workpiece. In addition, in the past electrodes have usually been rigidly secured to the electrical machining apparatus in a fixed relation with respect to rotation of the electrode relative to the electrical machining apparatus about the longitudinal axis of the electrode. Electrodes so secured to electrical machining apparatus often have unequal wear at different locations thereon which is undesirable from the standpoint of machining to accurate tolerances.

*Summary of the invention*

In accordance with the invention there is provided a simple, economical and efficient tool for supporting an electrode from electrical machining apparatus in a manner to permit rapid, accurate interchange of tools on the electrical machining apparatus, cutting of openings larger than the cross sectional area of the electrode and equal peripheral electrode wear.

The structure for rapidly and accurately securing the tool to electrical machining apparatus comprises a dovetail tool base plate portion engageable with a similar dovetail portion on the ram structure of electrical machining apparatus.

The structure for permitting machining of openings having an area larger than the cross sectional area of the electrode used includes structure for moving the electrode in a circular path about a center eccentric to the longitudinal axis of the electrode in accordance with the spark gap between the electrode and workpiece. Means for adjusting the relative position of the longitudinal axis of the electrode and the center of the circular path of the electrode is also provided in the quick-change tool of the invention.

DESCRIPTION OF THE PREFERRED EMBODIMENT

Figure 1:
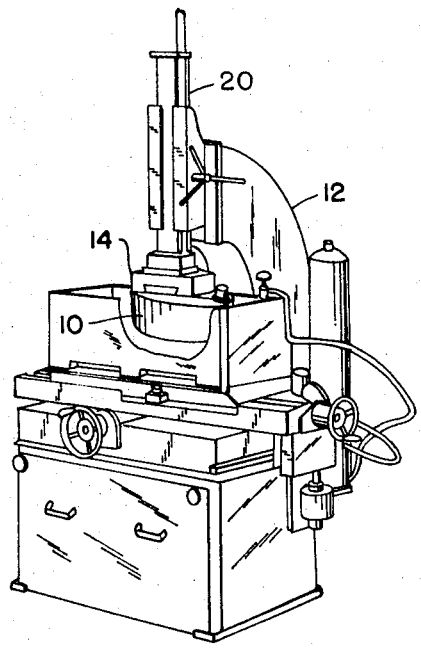
FIGURE 1 is a perspective view of a mechanical section of electrical discharge machining apparatus including a quick-change tool constructed in accordance with the invention secured thereto.

As shown in FIGURE 1 the quick-change tool 10 of the invention is secured to a mechanical section 12 for electrical discharge machining apparatus. The mechanical section 12 and electrical discharge machining apparatus including a power supply for providing pulsed direct current cutting energy to the insulated dovetail platen 14 of the mechanical section 12 and for providing a servo signal proportional to a spark gap between an electrode 16 secured to the tool 10 and a conducting workpiece (not shown) for driving the servo motor 18 of the tool 10 and/or the ram 20 supporting the platen 14 in the usual manner are well known in the art and will not be considered in detail herein. For a more complete treatment of such apparatus reference is made to the cross referenced related applications and patent and the references cited therein.

Figure 2:
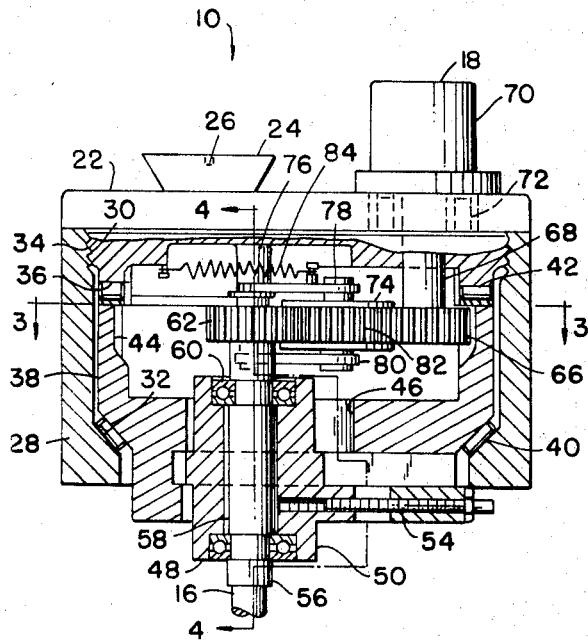
FIGURE 2 is an enlarged broken away elevation view of the quick-change tool illustrated in FIGURE 1.
Figure 3:
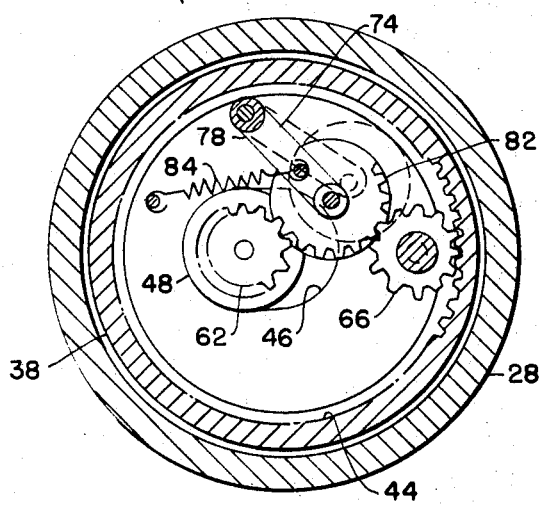
FIGURE 3 is a section view of the quick-change tool illustrated in FIGURE 1 taken substantially on the line 3—3 in FIGURE 2.
Figure 4:
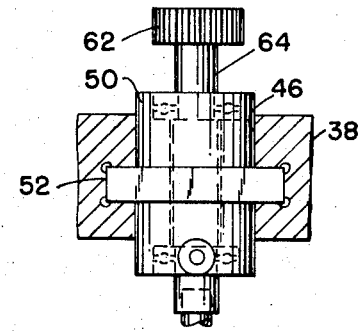
FIGURE 4 is a partial section view of the quick-change tool illustrated in FIGURE 1 taken substantially on the line 4—4 in FIGURE 2.

The quick-change tool for electrical machining 10, as illustrated best in FIGURES 2 through 4, includes a base plate 22 having a dovetail portion 24 extending from one side thereof with a locating slot 26 therein. The base plate 22 is adapted to be secured to the dovetail platen 14 of the mechanical section 12 of electrical machining apparatus in accordance with the procedure set forth in the cross referenced applications and patent. Rapid, accurate interchanging of other tools in a complete system of quick-change tooling for use with the electrical discharge machining apparatus is thus possible.

An outer cylindrical member 28 is secured to the other side of the base plate 22, by convenient means such as bolts (not shown). The outer cylindrical member 28 includes an internally threaded portion 30 at the end thereof connected to the base plate 22 and a tapered bearing surface 32 at the opposite end thereof. A disc 34 is threaded into the outer cylindrical member 28, again as shown best in FIGURE 2, having bearing surface 36.

An inner cylindrical member 38 is positioned within the outer cylindrical member 28 for rotation relative thereto on the bearings 40 and 42 engaged with the bearing surfaces 32 and 36, respectively. The inner cylindrical member 38 includes an internal gear portion 44 through which the inner cylindrical member 38 may be rotated relative to the outer cylindrical member 28. In addition, the inner cylindrical member 38 includes a slide opening 46 positioned therein centrally thereof in which electrode chuck structure 48 is adjustable.

The electrode chuck structure 48 includes the slide 50 guided in the guide opening 46 by the guide flanges 52 thereon. The chuck structure 48 is adjustable radially of the inner cylindrical member 38 by means of the adjusting screw 54 extending through a portion of the inner cylindrical member 38 and into the chuck body 50.

Collet 56 for securing the electrode 16 to the chuck structure 48 is rotatably secured to the chuck body 50 on the shaft 58 which is mounted in the bearings 60. A gear 62 is secured to the end 64 of the shaft 58, as shown best in FIGURE 4. Thus, on rotation of the gear 62, the shaft 58 is rotated to rotate the electrode about its longitudinal axis.

The inner cylindrical member 38 is driven through a gear 66 secured to the shaft 68 of servo motor 70. The gear 66 is in mesh with the internal gear portion 44 of the inner cylindrical member 38. The servo motor 70 is secured to the base plate 22 and the shaft 68 is rotatably mounted in the base plate 44 by bearing means 72. The servo motor 70 is driven in accordance with an electric signal received from electrical machining apparatus in accordance with the spark gap between the electrode 16 and a workpiece (not shown) in the usual manner for electrical machining.

The gear 62 is driven on driving of the gear 66 through drive structure 74, as best shown in FIGURE 3. The drive structure 74 is mounted on shaft stub 76 secured to the disc 34 and includes the spaced apart lever members 78 and 80 rotatably mounted at one end on the shaft 76 and the gear 82 rotatably mounted on the other ends of the levers 78 and 80. Spring 84 is connected to one of the levers 78 and 80 and to the disc 34 to urge the gear 82 into mesh with both the gears 66 and 62.

Thus, on rotation of the gear 66 the gear 82 is caused to rotate, to rotate the gear 62 and produce consequent rotation of the electrode 16 about its longitudinal axis. It will be noted that at the same time the inner cylindrical member 38 is rotated through the internal gear portion 44.

In overall operation of the quick-change tool 10 of the invention the screw 54 is first adjusted to determine the diameter of an opening to be cut in a workpiece, the tool is secured to the mechanical section 12 of electrical discharge machining apparatus, a workpiece is positioned beneath the electrode 16 and an opening is electrically machined in the workpiece by downward servo movement of the ram 20 in the usual manner. The opening will have the cross sectional area of the electrode 16.

Subsequently the inner cylindrical member 38 is caused to rotate with respect to the stationary outer cylindrical member 28 on rotation of the gear 66 by servo motor 70 connected to the electrical discharge machining apparatus. The electrode 16 is thus moved in a circular path having a center eccentric to the longitudinal axis of the electrode 16 whereby an opening larger than the cross sectional area of the electrode 16 may be produced in the workpiece. As indicated above, the diameter of the larger opening may be determined by the adjustment of the screw 54 for moving the chuck structure 48 relative to the axis of rotation of the inner cylindrical member 38.

Simultaneously with rotation of the inner cylindrical member 38 the gear 62 is rotated to produce rotation of the shaft 58 and the electrode 16 about the longitudinal axis thereof. Thus, the wear of the electrode 16 while tracing the circular path is equalized.

While one embodiment of the present invention has been described in detail, it will be understood that other embodiments and modifications are contemplated. It is the intention to include all embodiments and modifications as are defined by the appended claims within the scope of the invention.

What I claim as my invention is:

1. A tool for electrical machining in conjunction with electrical machining apparatus comprising means for securing the tool to electrical machining apparatus, electrode supporting first gear means having an axis of rotation for securing an electrode to the tool for revolving about a longitudinal axis thereof, second gear means operable between the first gear means and the means for securing the tool to the electrical machining apparatus for rotating the electrode in a path eccentric to the axis of rotation of the first gear means, and third gear means resiliently urged into mesh with the first and second gear means in adjusted positions thereof for driving one of the first and second gear means on the other of the first and second gear means being driven whereby an opening having an area greater than the cross section of the electrode may be machined by a revolving electrode.

2. Structure as set forth in claim 1 wherein the second gear means comprises an inner cylindrical member for supporting the first gear means having an internal gear therein and a first spur gear engaged with the internal gear secured to an outer cylindrical member and servo means for rotating the spur gear.

3. Structure as set forth in claim 2 wherein the first gear means comprises a slide carried by the inner cylindrical member, a spindle rotatably mounted in the slide and a second spur gear secured to the spindle for rotation thereof.

4. Structure as set forth in claim 3 wherein the third gear means comprises a third spur gear, means for pivotally mounting the third spur gear from the outer cylindrical member for arcuate movement into and out of engagement with the spur gears of the first and second gear means and resilient means operable between the outer cylindrical member and the third spur gear for urging the third spur gear into mesh with the spur gears of the first and second gear means.

5. Structure as set forth in claim 1 and further including means for adjusting the radial position of the first gear means on the inner cylindrical member whereby the eccentricity of the rotation of the electrode may be varied.

6. Structure as set forth in claim 5 wherein the means for adjusting the first gear means comprises an opening in the inner cylindrical member, a threaded opening in the second gear means and screw means extending through the opening in the inner cylindrical member and into the threaded opening.

7. Structure as set forth in claim 6 wherein the means for securing the tool to the electrical machining apparatus comprises a dovetail base plate secured to the outer cylindrical member.

8. Apparatus for electrical machining comprising means for supporting a workpiece in a fluid, a ram for movement toward and away from the workpiece to maintain a predetermined gap between an electrode secured to the ram and the workpiece and a tool carried by the ram including first gear means for securing an electrode to the tool for revolving about a longitudinal axis thereof, second gear means connected to the ram and operable between the ram and the first gear means for rotating the electrode in a path eccentric to the longitudinal axis of the electrode, and third gear means resiliently urged into mesh with the first and second gear means for driving one of the first and second gear means on the other of the first and second gear means being driven, whereby an opening having an area greater than the cross section of the electrode may be machined in conjunction with an electrical signal passed between the tool and workpiece by a revolving electrode.

9. Structure as set forth in claim 8 and further including means for adjusting the radial position of the first gear means relative to the longitudinal axis of the electrode.

10. Structure as set forth in claim 8 wherein the second gear means further includes means for rapidly and accurately securing the tool to the ram comprising a slot in one of the ram and second gear means and a dovetail portion extending from the other of the ram and second gear means adapted to be received within the dovetail slot.

References Cited

UNITED STATES PATENTS

| | | | |
|---|---|---|---|
| 2,539,439 | 1/1951 | Kumler | 219—69 |
| 2,773,968 | 12/1956 | Martellotti et al. | 219—69 |

RICHARD M. WOOD, *Primary Examiner.*

R. F. STAUBLY, *Assistant Examiner.*

U.S. Cl. X.R.

74—399